US006987438B2

(12) United States Patent
Eiselt et al.

(10) Patent No.: US 6,987,438 B2
(45) Date of Patent: Jan. 17, 2006

(54) BUSHING-TYPE TRANSFORMER FOR A SWITCH GEAR UNIT

(75) Inventors: Martin Eiselt, Gründau (DE); Thomas Gräb, Ebersburg Thalau (DE)

(73) Assignee: Siemens Aktiengesellschaft, Munich (DE)

( * ) Notice: Subject to any disclaimer, the term of this patent is extended or adjusted under 35 U.S.C. 154(b) by 4 days.

(21) Appl. No.: 10/484,102

(22) PCT Filed: Jul. 16, 2002

(86) PCT No.: PCT/DE02/02635

§ 371 (c)(1),
(2), (4) Date: Jan. 16, 2004

(87) PCT Pub. No.: WO03/009316

PCT Pub. Date: Jan. 30, 2003

(65) Prior Publication Data

US 2004/0246086 A1 Dec. 9, 2004

(30) Foreign Application Priority Data

Jul. 17, 2001 (DE) .......................... 201 12 356 U

(51) Int. Cl.
*H01F 38/20* (2006.01)
(52) U.S. Cl. ...................................... 336/174; 336/175
(58) Field of Classification Search ................. 336/83, 336/107, 174, 175, 192
See application file for complete search history.

(56) References Cited

U.S. PATENT DOCUMENTS

| 3,668,513 | A | * | 6/1972 | Tsubouchi et al. | ........... 323/361 |
| 3,996,543 | A | * | 12/1976 | Conner et al. | ................ 336/58 |
| 4,104,497 | A |   | 8/1978 | Brealey |  |
| 5,175,525 | A | * | 12/1992 | Smith | ........................... 336/83 |
| 5,376,911 | A |   | 12/1994 | Stenkvist |  |

FOREIGN PATENT DOCUMENTS

| DE | 3313192 A1 | 4/1983 |
| DE | 4412784 C2 | 10/1995 |
| DE | 297 14253 U1 | 10/1997 |
| DE | 29714 253 U1 | 10/1997 |
| DE | 29714253 U1 * | 10/1997 |
| DE | 19958782 A1 | 11/1999 |
| EP | 0 446 837 A1 | 3/1991 |
| EP | 0 645782 A1 | 7/1994 |
| JP | 11285112 A | 10/1999 |
| WO | WO 91/19035 | 12/1991 |

* cited by examiner

Primary Examiner—Tuyen T Nguyen
(74) Attorney, Agent, or Firm—Morrison & Foerster LLP

(57) ABSTRACT

The invention relates to a bushing-type transformer (1) comprising a conductive element (5) forming the primary conductor, supporting a flat contact surface (7) on one end thereof and a plug-in contact element (8) on the other end thereof, whereby the plug-in contact element (8) is embodied in a rotationally symmetrical manner and the rotational axis is arranged parallel to the flat contact surface (7). Said transformer also comprises a secondary winding (6) which surrounds the conductive piece (5) in an annular manner. The conductive element (5) extends in a linear manner and the plug-in contact element (8) is arranged on the surface area of the conductive piece (5).

3 Claims, 2 Drawing Sheets

BUSHING-TYPE TRANSFORMER FOR A SWITCH GEAR UNIT

CLAIM FOR PRIORITY

This application claims priority to International Application No. PCT/DE02/02635, published in the German language on Jan. 30, 2003, which claims the benefit of priority to German Application No. 201 12 356.8, filed in the German language on Jul. 17, 2001.

TECHNICAL FIELD OF THE INVENTION

The invention relates to a bushing-type transformer for an electrical switchgear assembly.

BACKGROUND OF THE INVENTION

A conventional transformer is disclosed, for example, in DE 297 14 253 U, where the conductor piece forms the primary conductor and the secondary winding surrounds the conductor piece in the form of a ring and are embedded in an insulating material body. The planar contact face and the plug-in contact piece are guided out of the insulating material body in order to be able to electrically connect the planar contact face, for example, to an electrical busbar and the plug-in contact piece, for example, to a power breaker. Within such a bushing-type transformer, the conductor run of the primary conductor is bent at right angles and is then bent back. The kinks form sites where there is increased electrical resistance and which are heated to a greater extent and these sites must be taken into account in the overall design of the bushing-type transformer.

SUMMARY OF THE INVENTION

The invention relates to a bushing-type transformer having a conductor piece, which forms the primary conductor and has a planar contact face at one of its ends and a plug-in contact piece at its other end, the plug-in contact piece being rotationally symmetrical, and the axis of rotation being arranged parallel to the planar contact face, as well as having a secondary winding surrounding the conductor piece in the form of a ring. Such bushing-type transformers serve, among other things, to guide electrical conductors through walls of encapsulated medium-voltage switchgear assemblies. In the switchgear assembly they connect, for example, a busbar chamber to a power breaker chamber and make it possible to electrically connect a busbar and a power breaker.

The present invention also discloses designing a bushing-type transformer of the type mentioned initially such that, in addition to having as compact a design as possible, reliable dissipation of heat is ensured.

This may be achieved, for example, by the conductor piece extending linearly, and by the plug-in contact piece being arranged on the outer surface of the conductor piece.

Designing the conductor piece such that it extends linearly results in the current being diverted in the region of the plug-in contact piece which is arranged on the outer surface, and the current diversion, when formed in an appropriate manner, slightly forms a site which is heated to a greater extent. This region is also spaced far enough apart from the secondary winding for, on the one hand, its insulating layer to be prevented from overheating and, on the other hand, the plug-in contact piece to be relieved of any thermal load. The arrangement of the plug-in contact piece on the outer surface of the primary conductor gives the bushing-type transformer as a whole—with the contact face connected, as is common, perpendicular to the busbar—a low overall depth.

Provision may advantageously be made for the conductor piece to be split into at least two parallel conductor branches at least in a sub-region of its length between the planar contact face and the plug-in contact piece.

The parallel arrangement of two or more conductor branches makes it possible to divide the current flowing through the conductor piece of the bushing-type transformer between two or more branches. This division reduces the current displacement effect. It is thus possible, whilst maintaining a constant cross section, to reduce the impedance as compared to that of a primary conductor which is conventionally of integral design.

A further advantageous embodiment of the invention provides for each conductor branch to have a rectangular cross section.

Conductor branches having a rectangular cross section can be arranged favorably in relation to one another and make it possible, when two or more bushing-type transformers are arranged next to one another within a switching panel of a switchgear assembly, to achieve an individual switching panel with as small a width as possible. Furthermore, conductor branches having a rectangular cross section can be produced relatively easily.

BRIEF DESCRIPTION OF THE DRAWINGS

One exemplary embodiment of the invention is illustrated in a drawing and described in more detail below.

In the drawings.

DETAILED DESCRIPTION OF THE INVENTION

Figure 1:
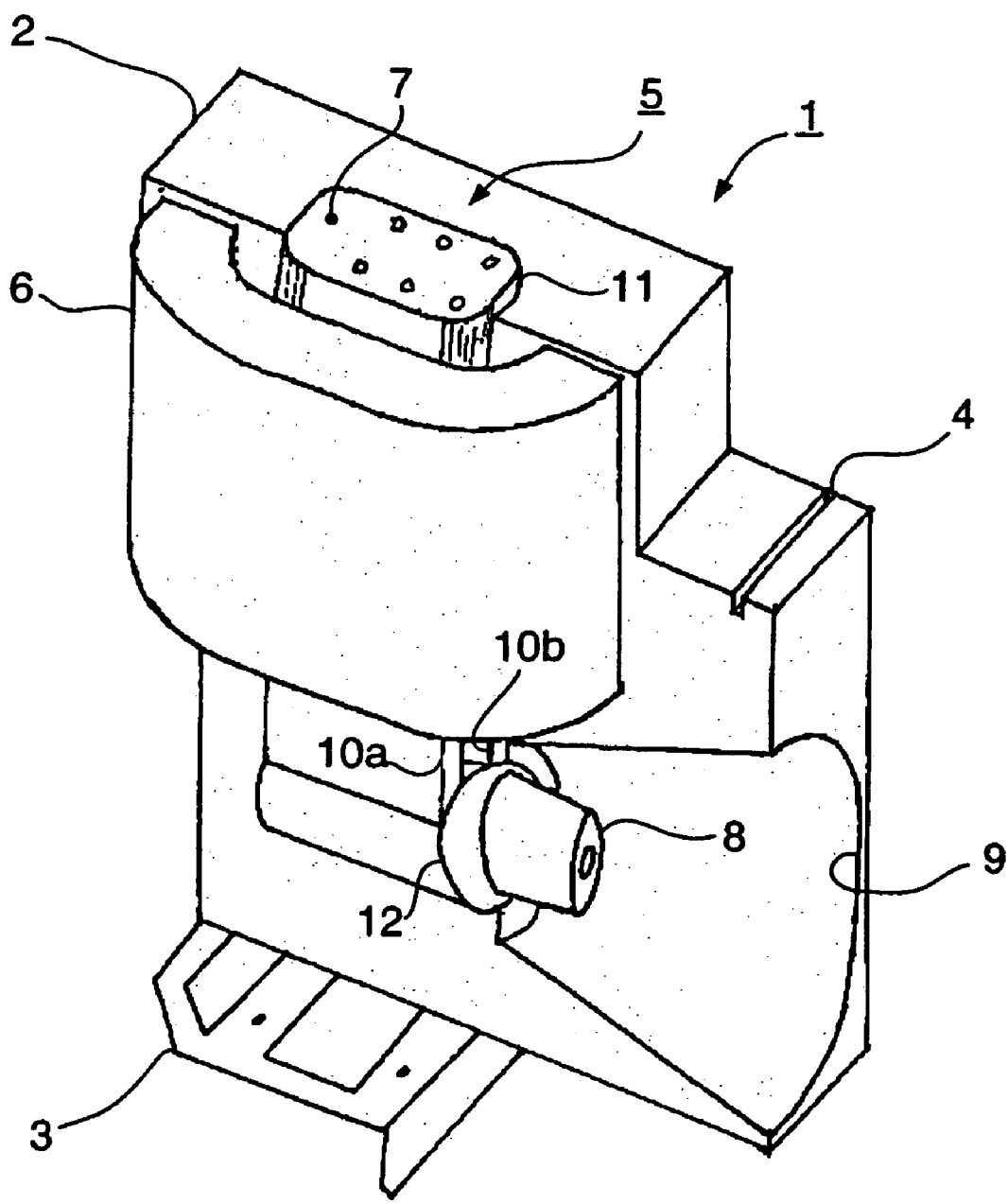
FIG. 1 shows a section through a bushing-type transformer.

The bushing-type transformer 1 illustrated in FIG. 1 has, for example, an insulating material body 2 made of cast resin. The insulating material body 2 is designed such that it has a minimum wall thickness which ensures sufficient dielectric strength whilst maintaining effective heat dissipation. A mounting plate 3 is arranged on the insulating material body 2. The mounting plate 3 serves to fix the bushing-type transformer 1 to a mounting frame of a switching panel. Furthermore, the insulating material body 1 has a groove 4 running around it. A correspondingly recessed plate can be pushed into this groove 4. This recessed plate may be, for example, a partition wall in a switching panel through which an electrical conductor can be passed Such a partition wall may be, for example, a partitioning wall between a busbar chamber, in which electrical busbars are arranged, and a switch chamber, in which an electrical switch is arranged, for example for switching an outgoing cable.

A conductor piece 5 which extends linearly and which forms the primary conductor of the bushing-type transformer 1 is embedded in the insulating material body 2. This conductor piece 5 runs in the vertical direction, once the bushing-type transformer 1 has been installed in a switching panel. The secondary winding 6 of the bushing-type transformer 1 is arranged around the conductor piece 5. The secondary winding 6 may have, for example, an oval or circular cross section. A connection piece 11 is passed out of the insulating material body 2 at the upper end of the conductor piece 5 and forms a planar contact face 7 at one end. The connection piece 11 has two or more threaded holes in the planar contact face 7 and these threaded holes can be used to fix a busbar to the conductor piece 5 by means of screws. A plug-in contact piece 8 is arranged on the outer surface of the conductor piece 5 at the other end of the conductor piece 5. The plug-in contact piece 8 is rotationally symmetrical. The axis of rotation of the plug-in contact piece 8 runs parallel to the plane of the contact face 7. The plug-in contact piece 8 emerges from the surface of the insulating material body 2 in the region of the base of an opening 9 in the form of a funnel.

Figure 2:
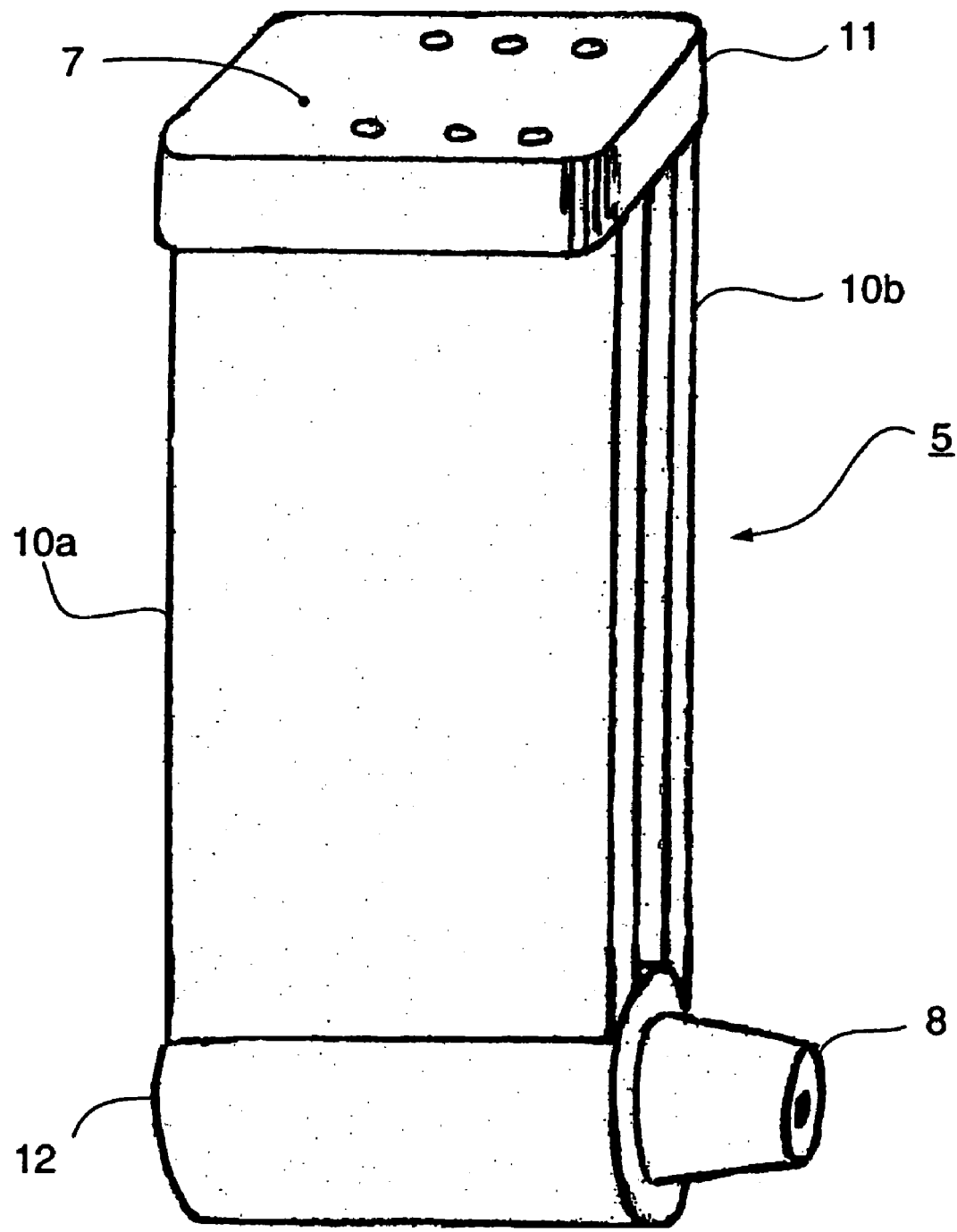
FIG. 2 shows a view of the primary conductor of the bushing-type transformer.

The conductor piece 5, illustrated separately in FIG. 2, shows the conductor piece 5 between the planar contact face 7 and the plug-in contact piece 8 split into two parallel conductor branches 10*a*, 10*b*. The two conductor branches 10*a*, 10*b* are formed on the principle of a double busbar. The conductor branches 10*a*, 10*b* are connected to the connection piece 11 in one of their end regions in an electrically conductive and mechanically robust manner. A cylindrical body 12 is integrally formed on the other end region of the conductor branches 10*a*, 10*b*. Advantageously, the conductor piece 5 is formed from drawn copper material. The individual parts are in each case soldered to one another. As an alternative to this, it is possible to manufacture the conductor piece 5 in a casting process.

What is claimed is:

1. A bushing-type transformer, comprising:
   a conductor piece, which forms a primary conductor, and has a planar contact face at one of its ends and a plug-in contact piece at its other end, the plug-in contact piece being rotationally symmetrical, and an axis of rotation being arranged parallel to the planar contact face; and
   a secondary winding surrounding the conductor piece in a form of a ring, wherein the conductor piece extends linearly, and the plug-in contact piece is arranged on an outer surface of the conductor piece.

2. The bushing-type transformer as claimed in claim 1, wherein the conductor piece is split into at least two parallel conductor branches at least in a subregion of its length between the planar contact face and the plug-in contact piece.

3. The bushing-type transformer as claimed in claim 2, wherein each conductor branch has a rectangular cross section.

* * * * *